(12) United States Patent
Izumi et al.

(10) Patent No.: US 11,967,840 B2
(45) Date of Patent: *Apr. 23, 2024

(54) POWER SUPPLY SYSTEM

(71) Applicant: TOYOTA JIDOSHA KABUSHIKI KAISHA, Toyota (JP)

(72) Inventors: Junta Izumi, Nagoya (JP); Kenji Kimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,554

(22) Filed: Jul. 8, 2022

(65) Prior Publication Data

US 2023/0068561 A1 Mar. 2, 2023

(30) Foreign Application Priority Data

Aug. 25, 2021 (JP) ................. 2021-136925

(51) Int. Cl.
| | |
|---|---|
| H02J 7/00 | (2006.01) |
| H01M 10/0525 | (2010.01) |
| H01M 10/44 | (2006.01) |
| H02J 1/10 | (2006.01) |
| H02M 7/217 | (2006.01) |

(52) U.S. Cl.
CPC ....... *H02J 7/0024* (2013.01); *H01M 10/0525* (2013.01); *H01M 10/441* (2013.01); (Continued)

(58) Field of Classification Search
CPC ........ H02J 7/0063; H02J 3/14; H02J 2207/20; H02J 3/32; H02J 7/0016; H02J 7/00712; (Continued)

(56) References Cited

U.S. PATENT DOCUMENTS 10,644,537 B2 * 5/2020 Krishnan ............... H02J 7/0016
11,424,620 B2 * 8/2022 Juang ....................... H02J 7/007
(Continued)

FOREIGN PATENT DOCUMENTS

| JP | 2018-074709 A | 5/2018 |
|---|---|---|
| WO | 2017/223267 A1 | 12/2017 |
| WO | 2018/079664 A1 | 5/2018 |

OTHER PUBLICATIONS

Akagi H et al. "a Battery Energy Storage System Based on a Multilevel Cascade PWM Converter". Power Electronics Conference, 2009, COBEP'09 Brazilian, IEEE, Piscataway, NJ, USA, Sep. 27, 2009 (Sep. 27, 2009), pp. 9-18.

(Continued)

*Primary Examiner* — Ryan Johnson
(74) *Attorney, Agent, or Firm* — Oliff PLC

(57) ABSTRACT

A power supply system comprises an alternating-current sweep unit that outputs alternating-current power from a U-phase battery string, a V-phase battery string, and a W-phase battery string that are Y-connected, a first power supply circuit that converts output of a direct-current sweep unit to alternating-current power using an inverter and outputs the alternating-current power, the direct-current sweep unit including a first battery string; and a control device. An energy density of a battery included in the U-phase battery string, the V-phase battery string, and the W-phase battery string is higher than an energy density of a battery included in the first battery string.

7 Claims, 10 Drawing Sheets

(52) U.S. Cl.
CPC ............ *H02J 1/102* (2013.01); *H02J 7/0019* (2013.01); *H02J 7/0063* (2013.01); *H02M 7/2173* (2013.01); *H02J 7/0016* (2013.01); *H02J 2207/20* (2020.01); *Y02E 60/10* (2013.01)

(58) Field of Classification Search
CPC ........ H02J 7/007194; H02J 7/34; H02J 7/342; H02J 7/0013; H02J 7/0024; H02J 7/0025; Y02E 60/10; H01M 10/441; H02M 7/483
See application file for complete search history.

(56) References Cited

U.S. PATENT DOCUMENTS

| | | | |
|---|---|---|---|
| 2011/0254373 A1* | 10/2011 | Johnson | ................ H02M 7/483 307/77 |
| 2018/0043789 A1 | 2/2018 | Goetz | |
| 2019/0267896 A1 | 8/2019 | Goto et al. | |
| 2020/0169080 A1 | 5/2020 | Yasoshima et al. | |
| 2021/0249951 A1 | 8/2021 | Goto et al. | |
| 2023/0062197 A1 | 3/2023 | Izumi et al. | |
| 2023/0063475 A1 | 3/2023 | Izumi et al. | |

OTHER PUBLICATIONS

U.S. Appl. No. 17/851,664, filed Jun. 28, 2022 in the name of Izumi et al.
Sep. 27, 2023 Office Action issued in U.S. Appl. No. 17/851,664.
U.S. Appl. No. 17/847,413, filed Jun. 23, 2022 in the name of Izumi et al.
U.S. Appl. No. 17/833,191, filed Jun. 6, 2023 in the name of Izumi et al.
Jan. 16, 2024 Notice of Allowance issued in U.S. Appl. No. 17/851,664.

* cited by examiner

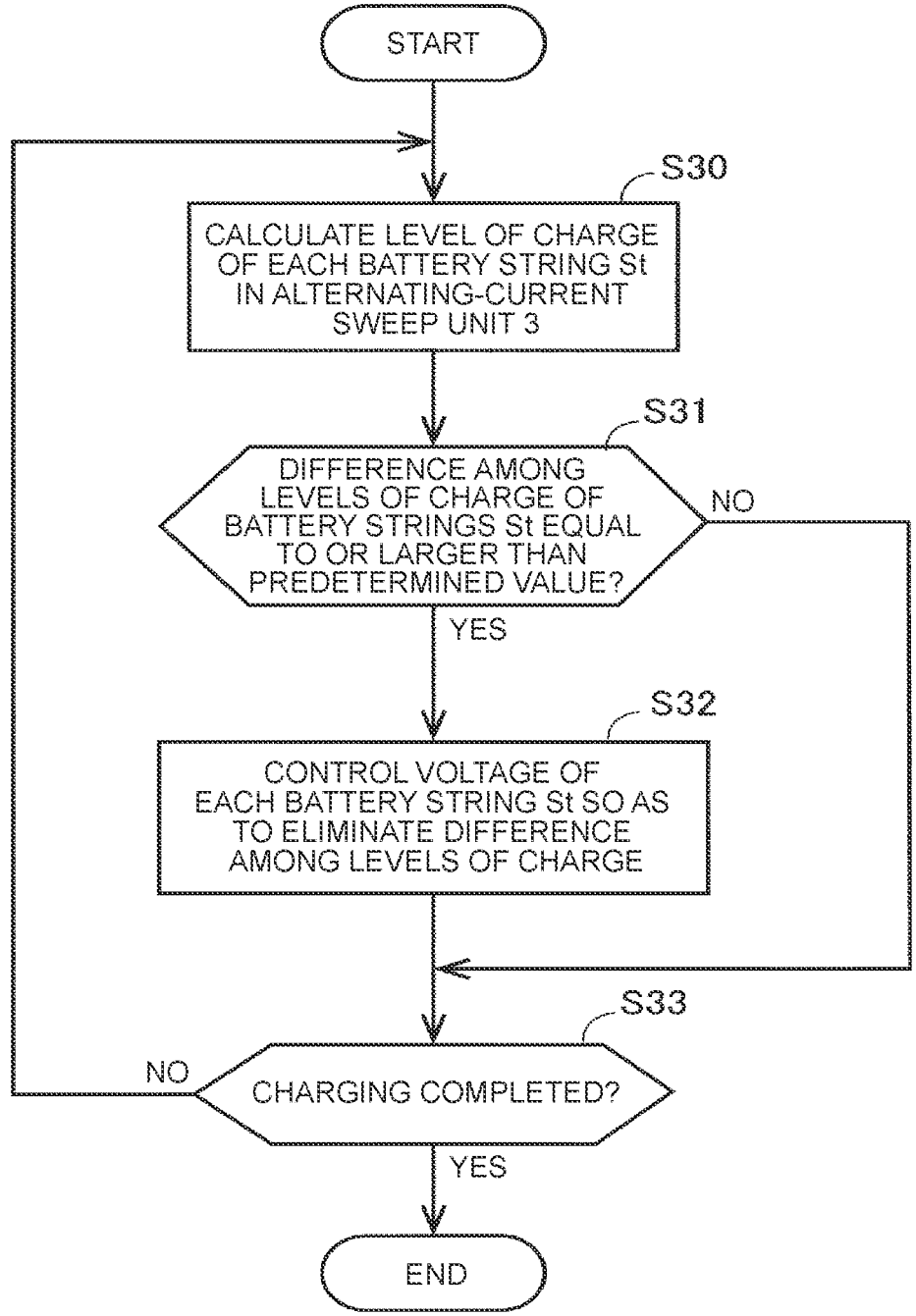

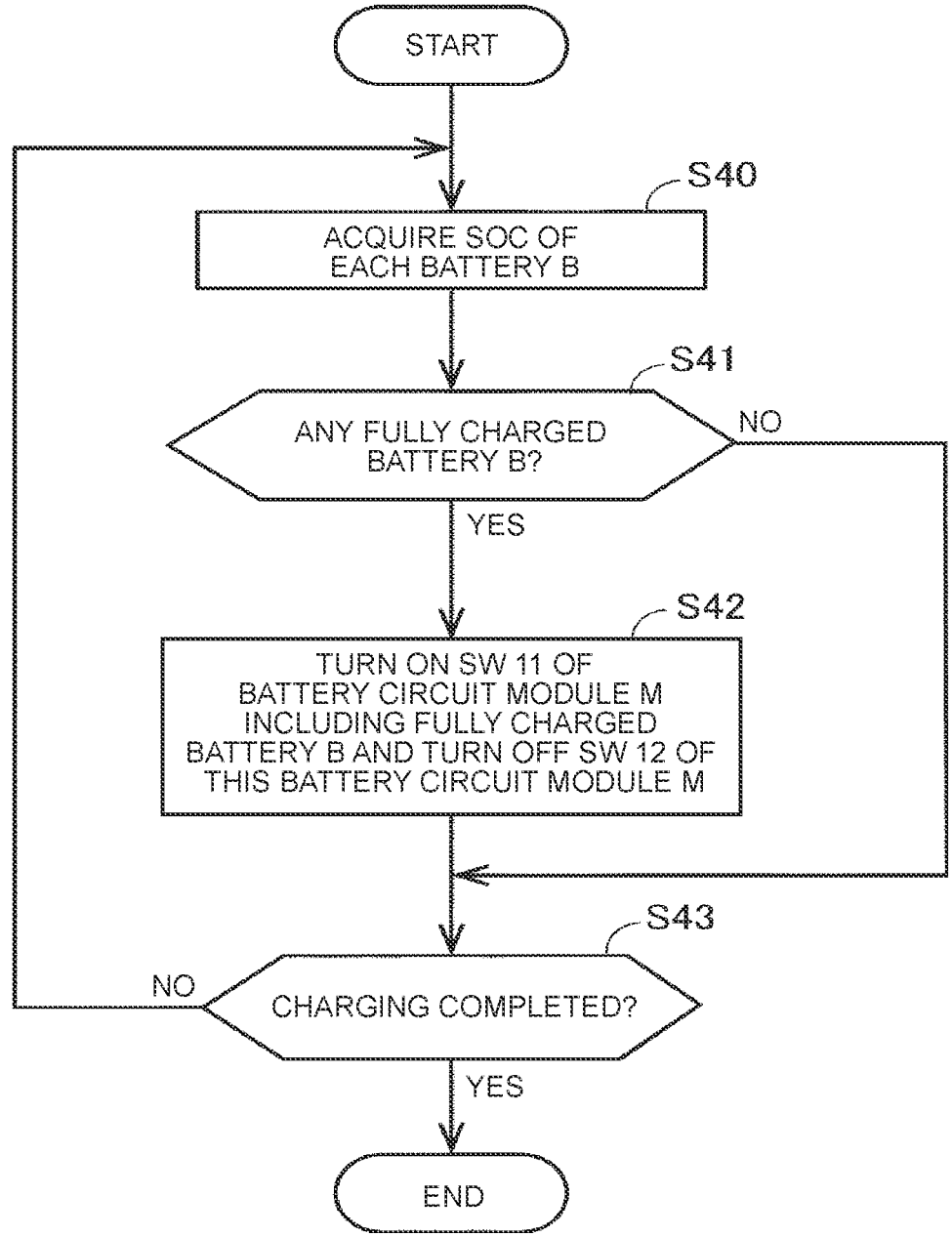

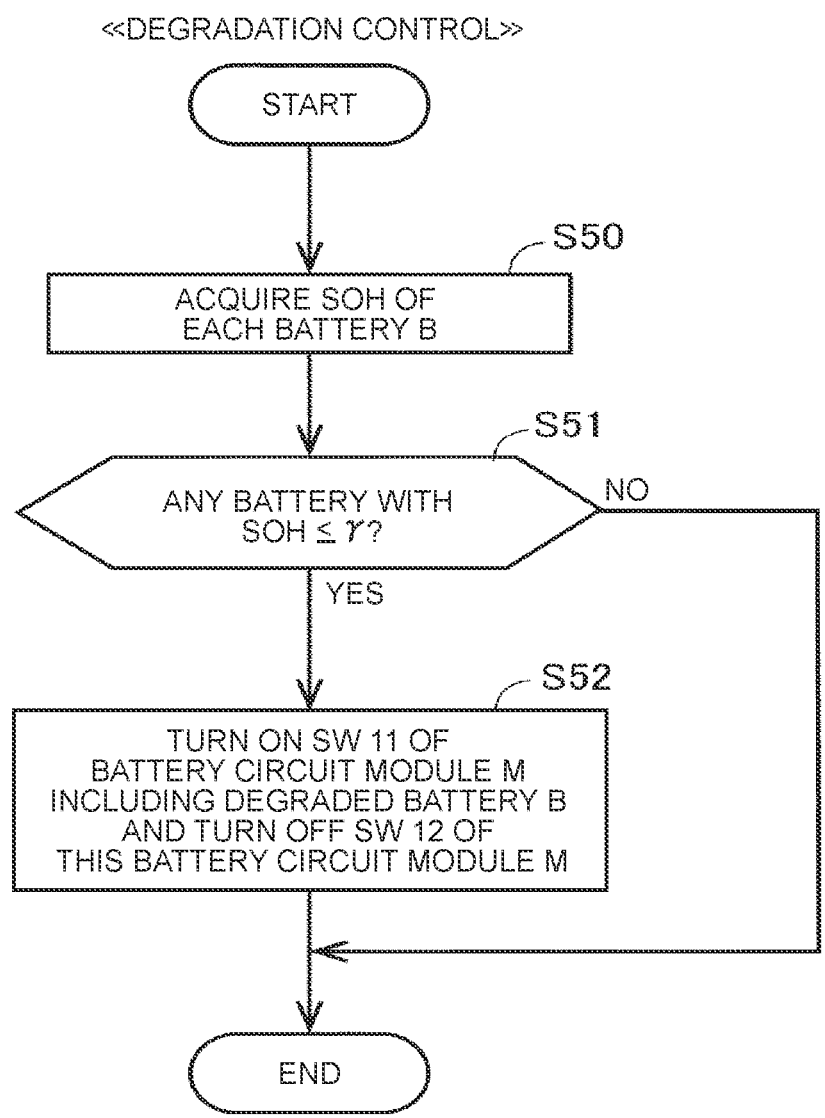

POWER SUPPLY SYSTEM

CROSS-REFERENCE TO RELATED APPLICATION

This application claims priority to Japanese Patent Application No. 2021-136925 filed on Aug. 25, 2021, incorporated herein by reference in its entirety.

BACKGROUND

1. Technical Field

The present disclosure relates to power supply systems, and more particularly to a power supply system using a plurality of battery strings.

2. Description of Related Art

Japanese Unexamined Patent Application Publication No. 2018-074709 (JP 2018-074709 A) discloses a control circuit for controlling a battery string. The battery string includes multiple battery circuit modules connected to each other. Each battery circuit module included in the battery string includes: a battery; a first switch connected in parallel with the battery; a second switch connected in series with the battery; and a first output terminal and a second output terminal to which the voltage of the battery is applied when the first switch is in the OFF state and the second switch is in the ON state. The control circuit can adjust the output voltage of the battery string to a desired magnitude by controlling the first and second switches of each battery circuit module included in the battery string.

SUMMARY

JP 2018-074709 A discloses a power supply system that outputs direct-current power using such a battery string. However, JP 2018-074709 A does not at all consider a power supply system that outputs alternating-current power using the battery string. If a power supply system that outputs alternating-current power using a battery string can be implemented, it will increase the applicable range of power strings, and a low cost of the power strings can be expected.

The present disclosure provides a power supply system that outputs alternating-current power using a battery string.

A power supply system according to one aspect of the present disclosure includes: an alternating-current sweep unit that outputs alternating-current power from a U-phase battery string, a V-phase battery string, and a W-phase battery string that are Y-connected; a first power supply circuit that converts output of a direct-current sweep unit including a first battery string to alternating-current power using an inverter and outputs the alternating-current power; and a control device that controls the alternating-current sweep unit and the first power supply circuit. The U-phase battery string, the V-phase battery string, the W-phase battery string, and the first battery string each include multiple battery circuit modules connected in series. Each of the battery circuit modules includes a battery, an output terminal that outputs a voltage of the battery, a first switch connected to the output terminal and connected in parallel with the battery, and a second switch connected in series with the battery. Each of the battery circuit modules is configured in such a manner that the voltage of the battery is applied to the output terminal when the first switch is in an OFF state and the second switch is in an ON state. The first power supply circuit and the alternating-current sweep unit are configured to be able to be electrically connected to an external power supply, and an energy density of each of the batteries included in the U-phase battery string, the V-phase battery string, and the W-phase battery string is higher than an energy density of each of the batteries included in the first battery string.

According to this configuration, an output voltage of the battery string can be controlled by controlling the state of the first and second switches of the battery circuit module. Since the U-phase battery string, V-phase battery string, and W-phase battery string of the alternating-current sweep unit are Y-connected, alternating-current power (e.g., three-phase alternating-current power) can be output to the external power supply by controlling the output voltage of each battery string. By converting direct-current power output from the first battery string to alternating-current power using the inverter, alternating-current power can be output from the first power supply circuit to the external power supply.

Since the alternating-current sweep unit outputs alternating-current power by controlling the first and second switches of the battery circuit modules, the alternating-current sweep unit is relatively inefficient. Accordingly, it is desirable to reduce maximum output (maximum power) of the alternating-current sweep unit, and it is preferable to charge and discharge the batteries of the battery strings in the alternating-current sweep unit at low rate. Since the energy density of the batteries included in the U-phase battery string, the V-phase battery string, and the W-phase battery string is higher than the energy density of the batteries included in the first battery string, the alternating-current power can be output efficiently and stably.

In the power supply system according to the above aspect, an output density of each of the batteries included in the first battery string may be higher than an output density of each of the batteries included in the U-phase battery string, the V-phase battery string, and the W-phase battery string.

Since the first power supply circuit outputs alternating-current power using the inverter, the first power supply circuit is more efficient than the alternating-current sweep unit. The batteries included in the first battery string have a higher output density than the batteries included in the U-phase battery string, the V-phase battery string, and the W-phase battery string. Therefore, when high output is requested, alternating-current power can be suitably output from the first power supply circuit. By combining power batteries with high output density (high output batteries) and energy batteries with high energy density (high capacity batteries), the power supply system can cause each kind of batteries to output power in the way they are good at (high output or long-term output). It is therefore possible to provide a high output, high capacity power supply system at low cost when compared to power supply systems using energy batteries alone or power batteries alone.

In the power supply system according to the above aspect, each of the batteries included in the first battery string may be a nickel metal hydride battery, and each of the batteries included in the U-phase battery string, the V-phase battery string, and the W-phase battery string may be a lithium-ion battery.

Electrified vehicles that are currently in widespread use often use either a nickel metal hydride battery or a lithium-ion battery as a battery for storing traction power. Typically, nickel metal hydride batteries have high output, low capacity battery characteristics, and lithium-ion batteries have low output, high capacity battery characteristics. Therefore, the nickel metal hydride batteries and the lithium ion batteries used in electrified vehicles can be reused to form the power supply system of the present disclosure.

In the power supply system according to the above aspect, the control device may be configured to: control the alternating-current sweep unit and the first power supply circuit so as to perform power balancing of the external power supply by input and output power of the alternating-current sweep unit and the first power supply circuit; when power requested by the power balancing is within a predetermined range, connect the alternating-current sweep unit to the external power supply and perform the power balancing of the external power supply by the alternating-current sweep unit; and when the power requested by the power balancing is larger than the predetermined range, connect the first power supply circuit in addition to the alternating-current sweep unit to the external power supply and perform the power balancing of the external power supply by the alternating-current sweep unit and the first power supply circuit.

According to this configuration, when the power requested by the power balancing is within the predetermined range, the power balancing of the external power supply is performed by the alternating-current sweep unit composed of the U-phase battery string, the V-phase battery string, and the W-phase battery string that include the batteries with high energy density. The power balancing can therefore be performed stably.

When the power requested by the power balancing is larger than the predetermined range, the power balancing of the external power supply is performed using the first power supply circuit in addition to the alternating-current sweep unit. It is therefore possible to deal with high output power balancing. In particular, when the batteries included in the first battery string have a high output density, high output alternating-current power can be stably output from the first power supply circuit.

In the power supply system according to the above aspect, the batteries included in the U-phase battery string, the V-phase battery string, and the W-phase battery string may be charged with power from the external power supply, and the control device may be configured to control the alternating-current sweep unit in such a manner that the U-phase battery string, the V-phase battery string, and the W-phase battery string have a same level of charge.

According to this configuration, the batteries included in the U-phase battery string, the V-phase battery string, and the W-phase battery string are charged with the power from the external power supply. At this time, the alternating-current sweep unit is controlled in such a manner that the U-phase battery string, the V-phase battery string, and the W-phase battery string have the same level of charge. Therefore, each of these battery strings stores the same amount of power (Wh), so that alternating-current power can be stably output from the alternating-current sweep unit.

In the power supply system according to the above aspect, the batteries included in the U-phase battery string, the V-phase battery string, and the W-phase battery string may be charged with power from the external power supply, and the control device may be configured to control the alternating-current sweep unit in such a manner that when a battery included in the U-phase battery string, the V-phase battery string, and the W-phase battery string is a fully charged battery and the multiple battery circuit modules includes a battery circuit module including the fully charged battery, the first switch of the battery circuit module including the fully charged battery is switched to the ON state and the second switch of the battery circuit module including the fully charged battery is switched to the OFF state to disconnect the battery circuit module including the fully charged battery from a series connection.

According to this configuration, the batteries included in the U-phase battery string, the V-phase battery string, and the W-phase battery string are charged with the power from the external power supply. At this time, the first switch of the battery circuit module including the fully charged battery is switched to the ON state and the second switch of the battery circuit module including the fully charged battery is switched to the OFF state to disconnect the battery circuit module (battery) from the series connection. Therefore, the risk of overcharging the battery can be reduced.

In the power supply system according to the above aspect, the control device may be configured to detect levels of degradation of the batteries included in the U-phase battery string, the V-phase battery string, and the W-phase battery string, and the control device may be configured to control the alternating-current sweep unit in such a manner that the first switch of a battery circuit module including a battery with a level of degradation higher than a predetermined value is switched to the ON state and the second switch of the battery circuit module including the battery with the level of degradation higher than the predetermined value is switched to the OFF state to disconnect the battery circuit module including the battery with the level of degradation higher than the predetermined value from a series connection, the multiple battery circuit modules including the battery circuit module including the battery with the level of degradation higher than the predetermined value.

According to this configuration, the first switch of the battery circuit module including the battery with a level of degradation higher than the predetermined value is switched to the ON state and the second switch of the battery circuit module including the battery with a level of degradation higher than the predetermined value is switched to the OFF state to disconnect this battery circuit module (battery) from the series connection. Therefore, alternating-current power can be stably output from the alternating-current sweep unit.

The present disclosure can provide a power supply system that outputs alternating-current power using a battery string.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 11 is a flowchart showing an example of a level of charge control process that is performed by the GCU 100;

FIG. 12 is a flowchart showing an example of an overcharge reduction control process that is performed by the GCU 100; and FIG. 13 is a flowchart showing an example of a degradation control process that is performed by the GCU 100.

DETAILED DESCRIPTION OF EMBODIMENTS

Hereinafter, an embodiment of the present disclosure will be described in detail with reference to the drawings. The same or corresponding portions are denoted by the same signs throughout the drawings, and description thereof will not be repeated.

Figure 1:
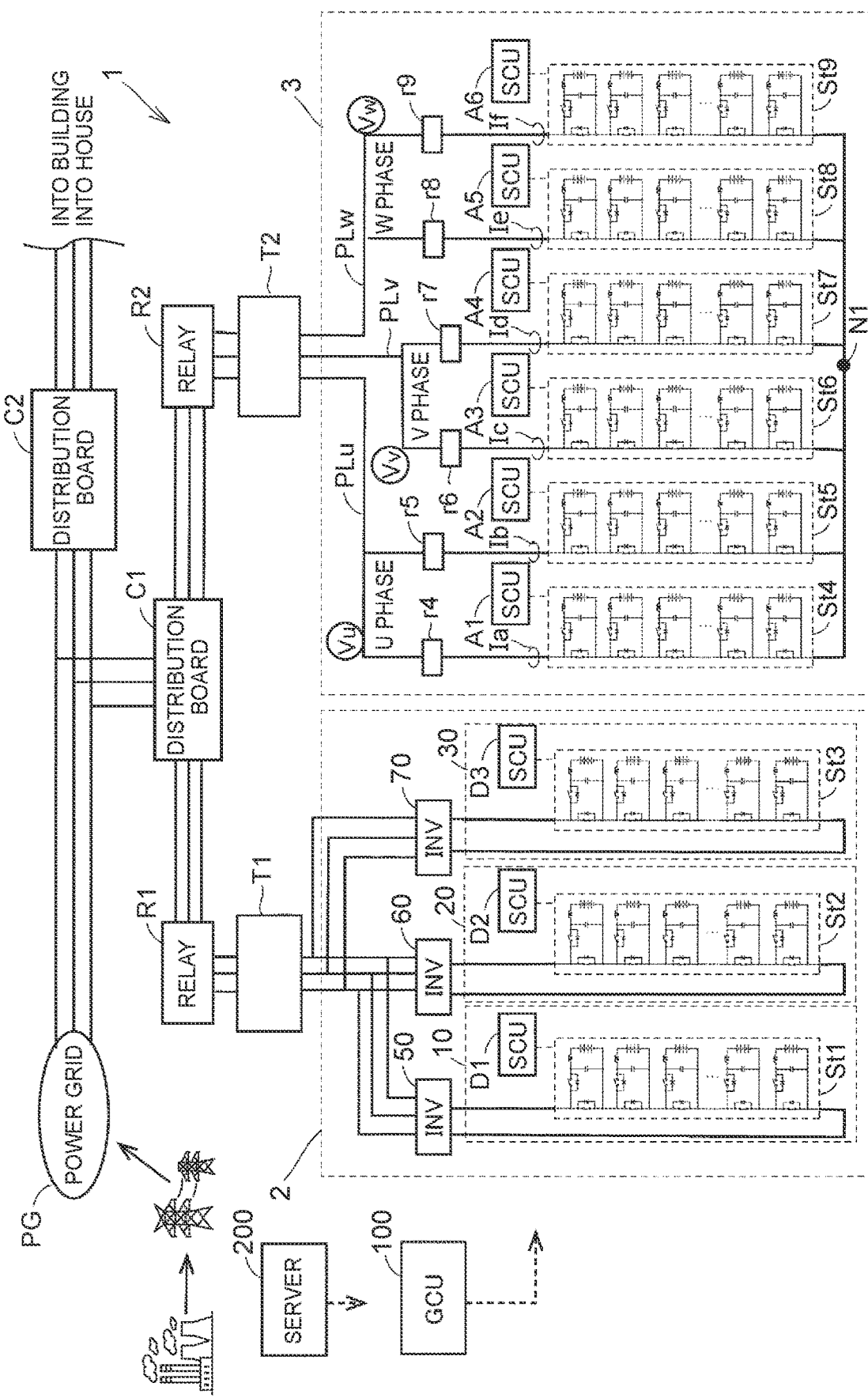
FIG. 1 shows a configuration of a power supply system 1 according to an embodiment.

FIG. 1 shows a configuration of a power supply system according to an embodiment. The power supply system 1 includes a first power supply circuit 2, an alternating-current sweep unit 3, and a group control unit (GCU) 100.

The first power supply circuit 2 includes a first direct-current sweep unit 10, a second direct-current sweep unit 20, a third direct-current sweep unit 30, a first inverter 50, a second inverter 60, and a third inverter 70. In the present embodiment, the configuration of string control units (SCU) D1 to D3, A1 to A6 and the configuration of battery strings St1 to St9 are the same among the first direct-current sweep unit 10, the second direct-current sweep unit 20, the third direct-current sweep unit 30, and the alternating-current sweep unit 3. Therefore, the configurations of these components will be described with reference to FIG. 2. Hereinafter, the battery strings St1 to St9 are referred to as "battery strings St" when not individually identified, and the SCU D1 to D3, A1 to A6 are simply referred to as "SCU" when not individually identified. Each configuration including an SCU and a battery string St is referred to as "sweep unit SU."

Figure 2:
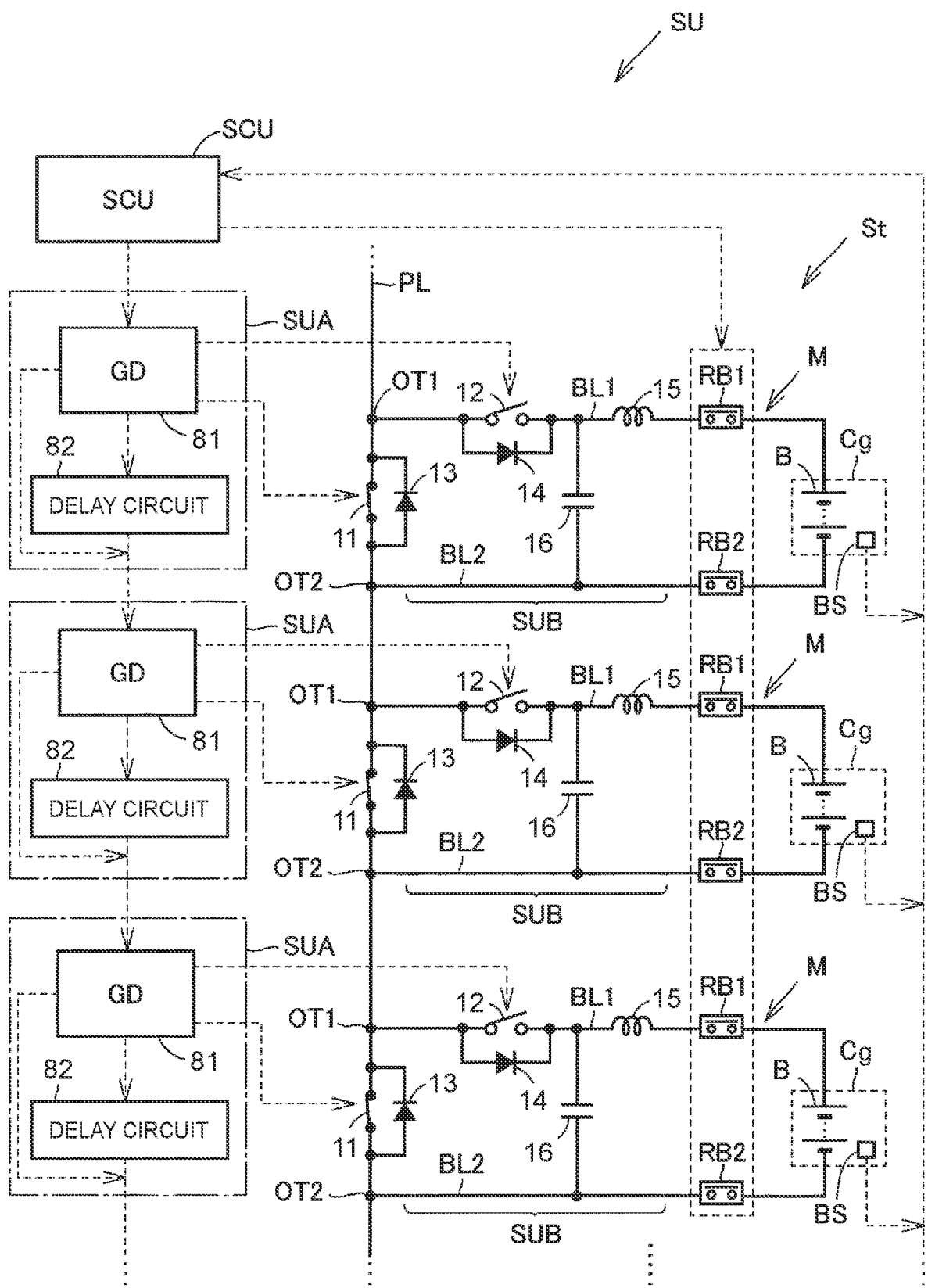
FIG. 2 shows a configuration of a sweep unit SU.

FIG. 2 shows a configuration of the sweep unit SU. The sweep unit SU includes an SCU, a drive circuit SUA, and a battery string St. The battery string St includes a plurality of battery circuit modules M. In the present embodiment, the battery string St includes 22 battery circuit modules M. However, the battery string St may include any number of battery circuit modules M, which may be 5 to 50, or 100 or more. In the present embodiment, each battery string St includes the same number of battery circuit modules M. However, the number of battery circuit modules M may be different for each battery string St.

Each battery circuit module M includes a power circuit SUB and a cartridge Cg. The cartridge Cg includes a battery B and a monitoring unit BS. The battery circuit module M including the battery B is formed by connecting the power circuit SUB and the battery B. The drive circuit SUA is configured to drive switches included in the battery circuit module M (more specifically, SW 11 and SW 12 that will be described later). The battery B may be a nickel metal hydride secondary battery or a lithium-ion secondary battery. The battery B may be manufactured by connecting secondary batteries used in electrified vehicles in series.

As shown in FIG. 2, a battery circuit module M includes a power circuit SUB, a cartridge Cg, and circuit breakers RB1, RB2 (hereinafter referred to as "circuit breakers RB" when not individually identified). The power circuit SUB and the cartridge Cg are connected to each other via the circuit breakers RB1, RB2. The SCU is configured to switch the connection state (electrically connected or disconnected) between the power circuit SUB and the cartridge Cg by controlling ON and OFF of each circuit breaker RB according to a control command from the GCU 100. The circuit breaker RB may be an electromagnetic mechanical relay. The circuit breaker RB may be configured to be manually turned on and off by a user.

In the present embodiment, the cartridge Cg is detachable from the power circuit SUB. For example, the user may remove the cartridge Cg from the power circuit SUB when the circuit breakers RB1, RB2 are in the OFF state (electrically disconnected state). Since the battery string St can operate even when there is an empty cartridge, the user can easily increase or decrease the number of cartridges Cg in the battery string St. Such a battery string St is suitable for battery reuse.

The monitoring unit BS of the cartridge Cg is configured to detect the state of the battery B (e.g., voltage, current, and temperature) and output the detection results to the SCU. The monitoring unit BS includes a voltage sensor that detects the voltage of the battery B, a current sensor that detects the current of the battery B, and a temperature sensor that detects the temperature of the battery B. The monitoring unit BS may be a battery management system (BMS) having a state of charge (SOC) estimation function, a state of health (SOH) estimation function, a battery voltage equalization function, a diagnostic function, and a communication function, in addition to the above sensor functions. The SCU acquires the state of each battery B (e.g., temperature, current, voltage, SOC, and internal resistance) based on the output of each monitoring unit BS, and outputs the acquired state of each battery B to the GCU 100.

The battery circuit modules M included in the battery string St are connected by a common electrical wire PL. The electrical wire PL includes output terminals OT1, OT2 of each battery circuit module M. The output terminal OT2 of each battery circuit module M is connected to the output terminal OT1 of its adjacent battery circuit module M. The battery circuit modules M included in the battery string St are thus connected to each other.

The power circuit SUB includes a first switching element 11 (hereinafter referred to as "SW 11"), a second switching element 12 (hereinafter referred to as "SW 12"), a first diode 13, a second diode 14, a choke coil 15, a capacitor 16, and output terminals OT1, OT2. Each of the SW 11, SW 12 is driven by the drive circuit SUA. The SW 11 and the SW 12 according to the present embodiment are examples of the "first switch" and the "second switch" according to the present disclosure, respectively.

The SW 11, the capacitor 16, and the battery B are connected in parallel between the output terminals OT1, OT2 of the power circuit SUB. The SW 11 is located on the electrical wire PL and is configured to switch the connection state (electrically connected or disconnected) between the output terminal OT1 and the output terminal OT2. The output terminal OT1 is connected to a positive electrode of the battery B via an electrical wire BL1, and the output terminal OT2 is connected to a negative electrode of the battery B via an electrical wire BL2. The circuit breakers RB1, RB2 are provided on the electrical wires BL1, BL2, respectively. The SW 12 and the choke coil 15 are also provided on the electrical wire BL1. In the battery circuit, the voltage of the battery B is applied between the output terminals OT1, OT2 when the SW 12 connected in series with the battery B is in the ON state (electrically connected state) and the SW 11 connected in parallel with the battery B is in the OFF state (electrically disconnected state).

The capacitor 16 connected to the electrical wires BL1, BL2 is provided at a position between the battery B and the output terminals OT1, OT2. One end of the capacitor 16 is connected to the electrical wire BL1 at a position between the SW 12 and the choke coil 15. The capacitor 16 smooths the voltage of the battery B and outputs the smoothed voltage between the output terminals OT1, OT2.

Each of the SW 11, SW12 is, for example, a field effect transistor (FET). The first diode 13 and the second diode 14 are connected in parallel with the SW 11 and the SW 12, respectively. The SW 12 is located between the output terminal OT1 and the choke coil 15. The choke coil 15 is located between the SW 12 and the positive electrode of the battery B. The battery B, the choke coil 15, and the capacitor 16 form an RLC filter. The RLC filter performs current leveling. Each of the SW 11, SW 12 is not limited to the FET and may be a switch other than the FET.

The SCU generates a gate signal according to a control command from the GCU 100. A drive circuit SUA is provided for each battery circuit module M. Each drive circuit SUA includes a gate driver (GD) 81 that drives the SW 11 and the SW 12 according to the gate signal, and a delay circuit 82 that delays the gate signal. Each of the SW 11, SW 12 included in the battery circuit module M is controlled ON and OFF according to the gate signal.

Figure 3:
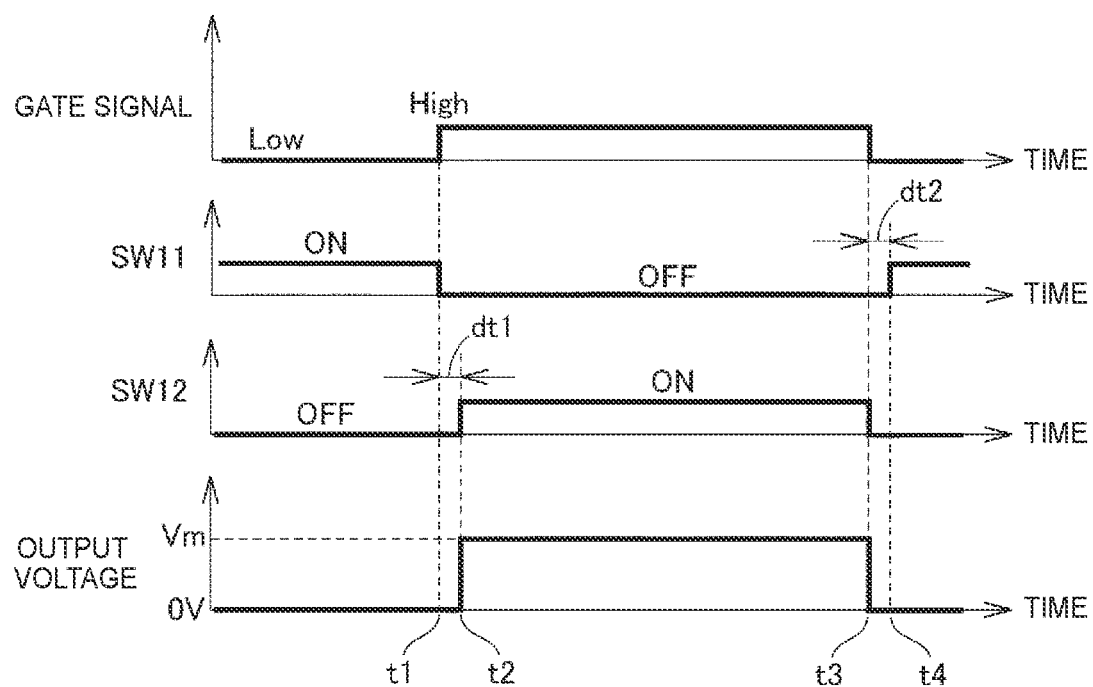
FIG. 3 is a timing chart showing an example of the operation of a battery circuit module M that is controlled by a gate signal.

FIG. 3 is a timing chart showing an example of the operation of the battery circuit module M that is controlled by the gate signal. In the present embodiment, a rectangular wave signal is used as the gate signal for driving the SW 11 and the SW 12. "Low" and "High" of the gate signal shown in FIG. 3 mean L level and H level of the gate signal (rectangular wave signal), respectively. The "output voltage" refers to a voltage that is output between the output terminals OT1, OT2.

In the initial state of the battery circuit module M, no gate signal is input to the drive circuit SUA (gate signal is at L level), and the SW 11 and the SW 12 are in the ON state and the OFF state, respectively.

When the gate signal is input to the drive circuit SUA, the GD 81 drives the SW 11 and the SW 12 according to the received gate signal. In the example shown in FIG. 3, the gate signal rises from L level to H level at time t1, and the SW 11 switches from the ON state to the OFF state at the same time as the rise of the gate signal. The SW 12 switches from the OFF state to the ON state at time t2, the time t2 being a time delayed by a predetermined amount of time (hereinafter referred to as "dt1") from the rise of the gate signal. As a result, the battery circuit module M switches to the driven state. Hereinafter, the period of time from the rise of the gate signal to the elapse of dt1 is sometimes referred to as "first delay period".

Figure 4:
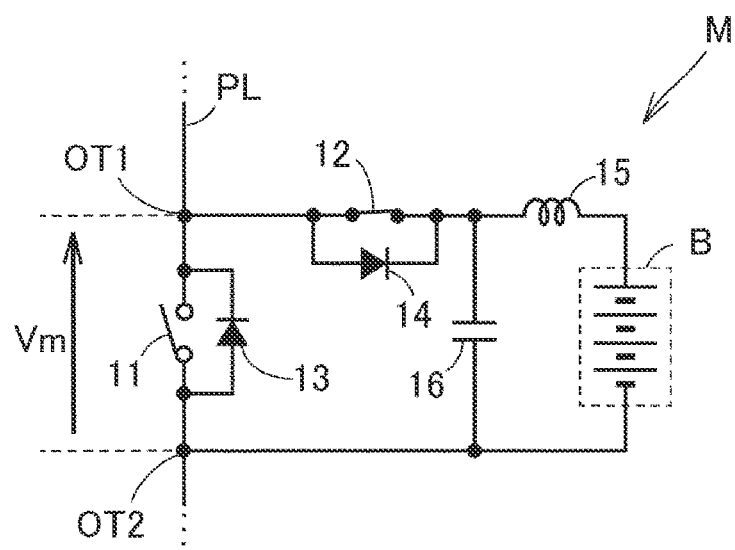
FIG. 4 shows the battery circuit module M in a driven state.

FIG. 4 shows the battery circuit module M in the driven state. In the battery circuit in the driven state, the voltage of the battery B is applied between the output terminals OT1, OT2 as the SW 11 is in the OFF state and the SW 12 is in the ON state. As the voltage of the battery B is applied between the output terminals OT1, OT2 via the capacitor 16, a voltage Vm is output between the output terminals OT1, OT2.

Referring to FIG. 3, when the gate signal falls from H level to L level at time t3, the SW 12 switches from the ON state to the OFF state at the same time as the fall of the gate signal. As a result, the battery circuit module M switches to the stopped state. In the battery circuit module M in the stopped state, as the SW 12 is in the OFF state, the voltage of the battery B is not applied between the output terminals OT1, OT2. The SW 11 then switches from the OFF state to the ON state at time t4, the time t4 being delayed by a predetermined amount of time (hereinafter referred to as "dt2") from the fall of the gate signal. The values dt1, dt2 may be the same, or may be different from each other. In the present embodiment, dt1 and dt2 are 100 nanoseconds. However, dt1 and dt2 can be set as desired.

Hereinafter, the period of time from the fall of the gate signal to the elapse of dt2 is sometimes referred to as "second delay period". The period from the end of the second delay period until the battery circuit module M switches to the driven state is sometimes referred to as "stop period."

Figure 5:
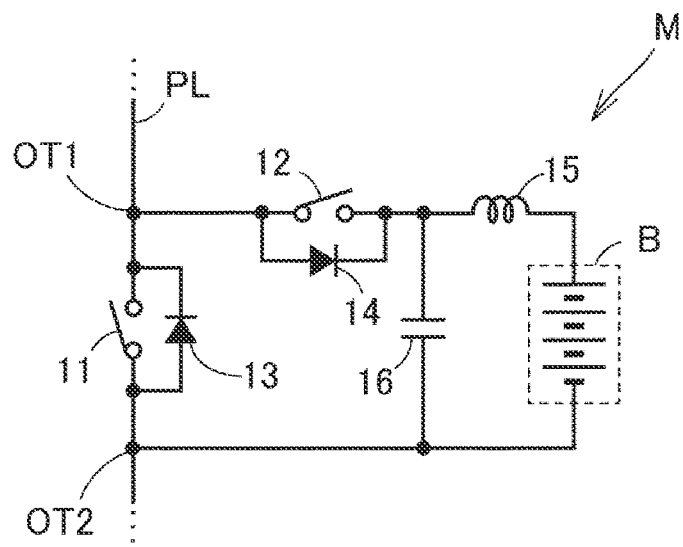
FIG. 5 shows a state of the battery circuit module M during a delay period.

FIG. 5 shows the state of the battery circuit module M during the delay period. As shown in FIG. 5, both the SW 11 and the SW 12 are in the OFF state during both the first delay period and the second delay period.

Figure 6:
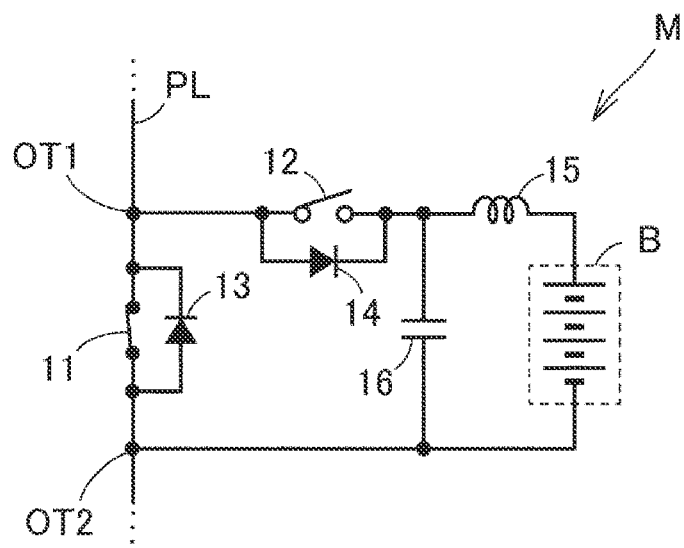
FIG. 6 shows a state of the battery circuit module M during a stop period.

FIG. 6 shows the state of the battery circuit module M during the stop period. As shown in FIG. 6, the SW 11 is in the ON state and the SW 12 is in the OFF state during the stop period, as in the initial state.

The battery circuit module M is in the stopped state during both the delay period and the stop period. In the battery circuit module M in the stopped state, no voltage is applied between the output terminals OT1, OT2. Providing the first delay period and the second delay period reduces the possibility that both the SW 11 and the SW 12 may be in the ON state at the same time (that is, the possibility that the battery circuit module M may be short-circuited).

By controlling the battery circuit modules M in the battery string St in the manner described above, the number of battery circuit modules M that are in the driven state can be adjusted, and the output voltage of the battery string St can be controlled. As a result (by adjusting the number of battery circuit modules M that are in the driven state at the same time), the sweep unit SU is configured to output a voltage from 0 V to the total voltage of the batteries B included in the battery string St.

Figure 7:
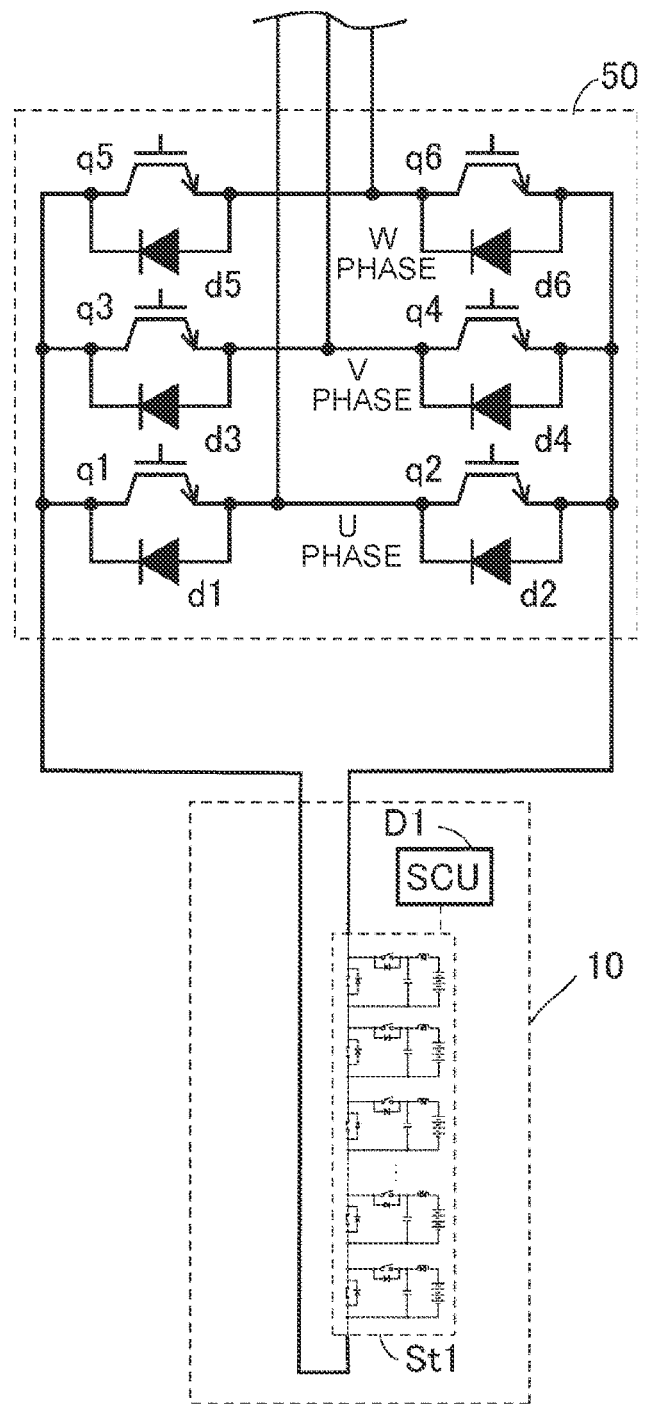
FIG. 7 shows a configuration of a first inverter 50.

Referring to FIG. 1, the first direct-current sweep unit 10 is a sweep unit SU configured as described above, and includes a battery string St1 and an SCU D1. The batteries B in the battery circuit modules M included in the battery string St1 are nickel metal hydride secondary batteries. Direct-current power output from the first direct-current sweep unit 10 is input to the first inverter 50. FIG. 7 shows a configuration of the first inverter 50. The first inverter 50 is a three-phase inverter, and includes switching elements q1, q2 connected in series with a U-phase arm, switching elements q3, q4 connected in series with a V-phase arm, and switching elements q5, q6 connected in series with a W-phase arm. Diodes d1 to d6 are connected in antiparallel between the collectors and emitters of the switching elements q1 to q6, respectively.

An intermediate point of each phase arm of the first inverter 50 is connected to an insulation filter T1 and is further connected to a power grid PG via a relay R1 and a distribution board C1 (see FIG. 1). The switching elements q1 to q6 of the first inverter 50 are turned on and off by, for example, pulse width modulation (PWM) control according to a control command from the GCU 100. The first inverter 50 converts the direct-current power output from the first direct-current sweep unit 10 to alternating-current power (three-phase alternating-current power) and supplies the alternating-current power to the power grid PG. The first inverter 50 also converts alternating-current power (three-phase alternating-current power) supplied from the power grid PG to direct-current power and supplies the direct-current power to the first direct-current sweep unit 10 to charge the batteries B in the battery string St1. In the present embodiment, a three-phase inverter used to drive a three-phase synchronous motor of an electrified vehicle is reused as the first inverter 50.

In FIG. 1, the second direct-current sweep unit 20 including a battery string St2 and an SCU D2 and the third direct-current sweep unit 30 including a battery string St3 and an SCU D3 have the same configuration as the first direct-current sweep unit 10. The second inverter 60 connected to the second direct-current sweep unit 20 and the third inverter 70 connected to the third direct-current sweep unit 30 have the same configuration as the first inverter 50. Intermediate points of the three-phase arms of the first inverter 50, the second inverter 60, and the third inverter 70 are connected by power lines, and the first direct-current sweep unit 10, the second direct-current sweep unit 20, and the third direct-current sweep unit 30 are connected (electrically) in parallel with the insulation filter T1. Accordingly, the first power supply circuit 2 outputs alternating-current power (three-phase alternating-current power) from the first direct-current sweep unit 10, the second direct-current sweep unit 20, and the third direct-current sweep unit 30 that are connected in parallel (by using the first to third inverters 50 to 70).

Figure 8:
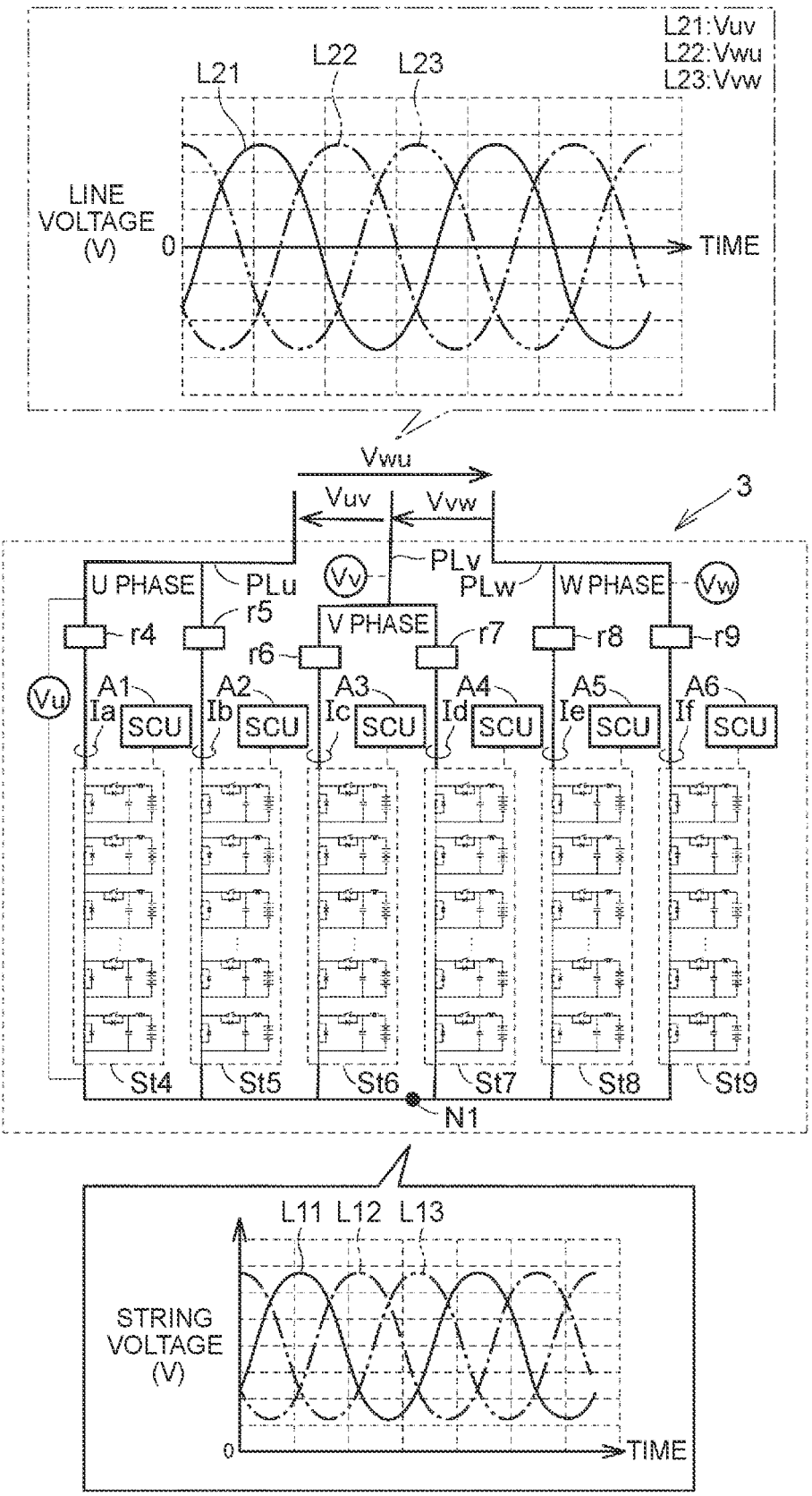
FIG. 8 shows a configuration of an alternating-current sweep unit 3.

FIG. 8 shows a configuration of the alternating-current sweep unit 3. A first U-phase battery string St4 and an SCU A1 have substantially the same configuration as the battery string St and the SCU in the sweep unit SU described with reference to FIG. 2. The same applies to "second U-phase battery string St5 and SCU A2," "first V-phase battery string St6 and SCU A3," "second V-phase battery string St7 and SCU A4," "first W-phase battery string St8 and SCU A5," and "second W-phase battery string St9 and SCU A6."

In the present embodiment, the batteries B in the battery circuit modules M included in the first U-phase battery string St4, the first V-phase battery string St6, and the first W-phase battery string St8 are ternary (lithium nickel manganese cobalt oxide (NMC)) lithium-ion secondary batteries. In addition, the batteries B in the battery circuit modules M included in the second U-phase battery string St5, the second V-phase battery string St7, and the second W-phase battery string St9 are lithium iron phosphate (LFP) lithium-ion secondary batteries.

In FIG. 8, a positive terminal of the first U-phase battery string St4 and a positive terminal of the second U-phase battery string St5 are connected to a power line PLu via a relay r4 and a relay r5, respectively. A positive terminal of the first V-phase battery string St6 and a positive terminal of the second V-phase battery string St7 are connected to a power line PLv via a relay r6 and a relay r7, respectively. A positive terminal of the first W-phase battery string St8 and a positive terminal of the second W-phase battery string St9 are connected to a power line PLw via a relay r8 and a relay r9, respectively. Negative terminals of the battery strings St4 to St9 are connected to a neutral point Ni. The alternating-current sweep unit 3 thus has a configuration in which the "first and second U-phase battery strings St4, St5 connected in parallel," the "first and second V-phase battery strings St6, St7 connected in parallel," and the "first and second W-phase battery strings St8, St9 connected in parallel" are Y-connected.

The relays r4 to r9 may be electromagnetic mechanical relays. The relays r4 to r9 are controlled ON and OFF by the GCU 100 or the SCUs A1 to A6 to electrically connect and disconnect the battery strings St4 to St9 to and from the power lines PLu to PLw. When the SCUs A1 to A6 and the battery strings St4 to St9 are normal, the relays r4 to r9 are always in the ON state and electrically connect the battery strings St4 to St9 to the power lines PLu to PLw. When an abnormality (failure) occurs in any of the SCUs A1 to A6 or the battery strings St4 to St9, the relay r4 to r9 corresponding to the abnormal one of the SCUs A1 to A6 or the battery strings St4 to St9 is switched to the OFF state and electrically disconnects the corresponding battery strings St from the corresponding power line.

The alternating-current sweep unit 3 includes a voltage sensor Vu, a voltage sensor Vv, and a voltage sensor Vw. The voltage sensor Vu detects a U-phase string voltage that is a voltage of the first U-phase battery string St4 and the second U-phase battery string St5. The voltage sensor Vv detects a V-phase string voltage that is a voltage of the first V-phase battery string St6 and the second V-phase battery string St7. The voltage sensor Vw detects a W-phase string voltage that is a voltage of the first W-phase battery string St8 and the second W-phase battery string St9.

The alternating-current sweep unit 3 further includes current sensors Ia to If. The current sensor Ia detects an input and output current of the first U-phase battery string St4. The current sensor Ib detects an input and output current of the second U-phase battery string St5. The current sensor Ic detects an input and output current of the first V-phase battery string St6. The current sensor Id detects an input and output current of the second V-phase battery string St7. The current sensor Ie detects an input and output current of the first W-phase battery string St8. The current sensor If detects an input and output current of the second W-phase battery string St9.

The SCUs A1 to A6 control the SWs 11, 12 of the battery circuit modules M at a switching frequency of several tens of kilohertz according to control commands from the GCU 100 to control the string voltages (output voltages) of the battery strings St4 to St9 so that these string voltages have voltage waveforms shown at the bottom of FIG. 8. In FIG. 8, line L11 represents the string voltage of the first U-phase battery string St4 and the second U-phase battery string St5. Line L12 represents the string voltage of the first V-phase battery string St6 and the second V-phase battery string St7. Line L13 represents the string voltage of the first W-phase battery string St8 and the second W-phase battery string St9. Lines L11, L12, and L13 are sine waves that are 120° apart in phase, and their frequency is 60 Hz which is a frequency compatible with the power grid PG.

As the string voltages of the battery strings St4 to St9 are controlled as described above, the line voltages of the power lines PLu, PLv, and PLw have voltage waveforms shown at the top of FIG. 8. In FIG. 8, line L21 represents the line voltage "Vuv" between the power lines PLu and PLv, line L22 represents the line voltage "Vwu" between the power lines PLw and PLu, and line L23 represents the line voltage "Vvw" between the power lines PLv and PLw. Each line voltage has a sinusoidal alternating-current waveform that periodically changes in polarity (positive or negative). The alternating-current sweep unit 3 thus outputs alternating-current power (three-phase alternating-current power).

Referring to FIG. 1, the alternating-current power output from the first power supply circuit 2 is supplied to the power grid PG via the insulation filter T1, the relay R1, and the distribution board C1. The alternating-current power output from the alternating-current sweep unit 3 is supplied to the power grid PG via an insulation filter T2, a relay R2, and the distribution board C1.

Each of the insulation filters T1, T2 includes, for example, an LCL filter and a three-phase transformer. Each of the insulation filters T1, T2 reduces the noise component of the three-phase alternating-current power by the LCL filter, and converts the three-phase alternating-current power to a predetermined voltage (e.g., 200 V) and insulates the input and output sides from each other by the three-phase transformer.

The relays R1, R2 may be electromagnetic mechanical relays. Connection (parallel-on) and disconnection (parallel-off) of the first power supply circuit 2 and the power grid PG are performed by GCU 100 controlling ON and OFF of the relay R1. Connection and disconnection of the alternating-current sweep unit 3 and the power grid PG are performed by GCU 100 controlling ON and OFF of the relay R2.

The distribution board C1 includes an earth leakage circuit breaker and/or a breaker, and distributes the power of the power grid PG to the first power supply circuit 2 and the alternating-current sweep unit 3 when charging the batteries B of the battery strings St included in the first power supply circuit 2 and the alternating-current sweep unit 3. The distribution board C1 also supplies the power output from the first power supply circuit 2 and the alternating-current sweep unit 3 to the power grid PG.

When charging the batteries B of the battery strings St included in the first power supply circuit 2, the first to third inverters 50 to 70 convert the alternating-current power supplied from the power grid PG to direct-current power to charge the batteries B. When charging the batteries B of the battery strings St included in the alternating-current sweep unit 3, the SCUs A1 to A6 control the SWs 11, 12 of the battery strings St included in the alternating-current sweep unit 3 so that the voltage of the battery strings St becomes slightly lower than the alternating-current voltage supplied from the power grid PG to charge the batteries B.

The alternating-current power that is supplied from the first power supply circuit 2 and the alternating-current sweep unit 3 to the power grid PG is supplied together with the alternating-current power from the power grid PG to wires in a building or house via a distribution board C2.

A server 200 manages supply and demand of the power grid PG (power network) provided by an electric power company (power producer and power transmission and distribution business operator). The server 200 is configured to communicate with the GCU 100, and requests the GCU 100 to perform power balancing of the power grid PG as necessary. In response to the request from the server 200, the GCU 100 controls the SCUs of the sweep units SU, the first to third inverters 50 to 70, and the relays R1, R2 to adjust the input and output power of the first power supply circuit 2 and the alternating-current sweep unit 3. The GCU 100 may be a computer. The GCU 100 includes, for example, a processor, a random access memory (RAM), and a storage device (none of which are shown). The GCU 100 performs various processes by the processor executing programs stored in the storage device. However, the various processes of the GCU 100 need not necessarily be performed by software, and may be performed by dedicated hardware (electronic circuit).

Output Request Process

Figure 9:
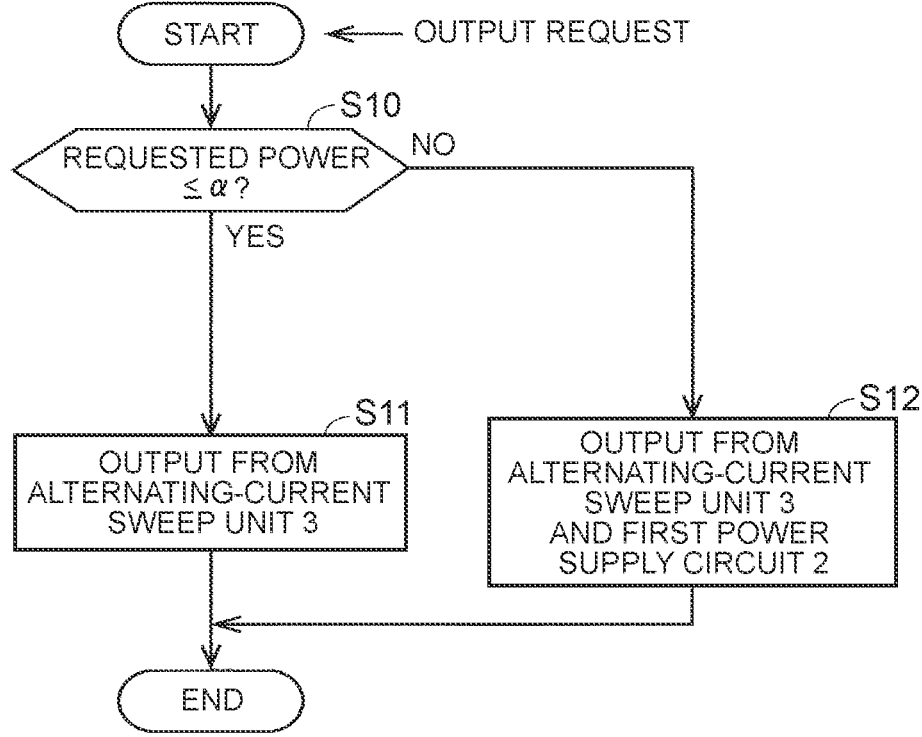
FIG. 9 is a flowchart showing an example of an output request process that is performed by a group control unit (GCU) 100 when output of power is requested for power balancing by a server 200.

FIG. 9 is a flowchart showing an example of an output request process that is performed by the GCU 100 when output of power is requested for power balancing by the server 200. The GCU 100 performs the output request process of this flowchart in response to an output request from the server 200. When the GCU 100 receives an output request from the server 200, the GCU 100 determines in step (step is hereinafter abbreviated as "S") 10 whether requested power is equal to or less than $\alpha$. $\alpha$ represents a value that is set in advance by specifications such as the number of battery strings St in the power supply system 1, and may be, for example, 20 kW. When the requested power is equal to or less than a, namely when YES in S10, the process proceeds to S11.

In S11, the GCU 100 outputs alternating-current power from the alternating-current sweep unit 3 and supplies the alternating-current power to the power grid PG. The GCU 100 turns on the relay R2 to connect (in parallel) the alternating-current sweep unit 3 and the power grid PG, and controls the SWs 11, 12 of the battery strings St4 to St9 by the SCUs A1 to A6 to output the alternating-current power (three-phase alternating-current power) from the alternating-current sweep unit 3.

When the requested power is larger than a, namely when NO in S10, the process proceeds to S12. In S12, the GCU 100 outputs alternating-current power from the first power supply circuit 2 as well as from the alternating-current sweep unit 3 and supplies the alternating-current power to the power grid PG. In addition to outputting the alternating-current power (three-phase alternating-current power) from the alternating-current sweep unit 3 in a manner mentioned above (as in S11), the GCU 100 also turns on the relay R1 to connect (in parallel) the first power supply circuit 2 and the power grid PG. The GCU 100 controls the SWs 11, 12 of the battery strings St1 to St3 by the SCUs D1 to D3 to output direct-current power from the first direct-current sweep unit 10, the second direct-current sweep unit 20, and the third direct-current sweep unit 30. The GCU 100 converts the direct-current power to alternating-current power using the first to third inverters 50 to 70 and supplies the alternating-current power (three-phase alternating-current power) to the power grid PG. As described above, when the requested power is larger than a, the GCU 100 outputs alternating-current power from the first power supply circuit 2 and the alternating-current sweep unit 3 and supplies the alternating-current power to the power grid PG.

The batteries B of the battery strings St in the first, second, and third direct-current sweep units 10, 20, and 30 included in the first power supply circuit 2 are nickel metal hydride secondary batteries. The batteries B of the battery strings St in the alternating-current sweep unit 3 are lithium-ion secondary batteries. Due to battery characteristics, the output density (W/kg) of a nickel metal hydride secondary battery is higher than that of a lithium-ion secondary battery. The energy density (Wh/kg) of a lithium-ion secondary battery is higher than that of a nickel metal hydride secondary battery. Accordingly, a nickel metal hydride secondary battery is located in the upper left region in a Ragone plot, and can be said to be a power (output) battery. A lithium-ion secondary battery is located in the lower right region in a Ragone plot, and can be said to be an energy (capacity) battery.

The alternating-current sweep unit 3 outputs alternating-current power by controlling the SWs 11, 12 of the battery strings St at several tens of kilohertz. The alternating-current sweep unit 3 is therefore less efficient (low efficiency), and it is desirable to reduce the maximum output (maximum power) of the alternating-current sweep unit 3. Therefore, in order to increase the output (power (W)) of the alternating-current sweep unit 3, the number of parallel battery strings St needs to be increased, and this leads to an increase in cost. It is therefore preferable to use the batteries B of the battery strings St in the alternating-current sweep unit 3 such that the batteries B are charged and discharged at low rate. Since energy batteries with high energy density are desirable as the batteries B of the battery strings St in the alternating-current sweep unit 3, lithium-ion secondary batteries are used as the batteries B of the battery strings St in the alternating-current sweep unit 3 in the present embodiment.

On the other hand, since the first power supply circuit 2 outputs alternating-current power using the inverters, the first power supply circuit 2 is relatively efficient, and it is possible for the first power supply circuit 2 to have high maximum output. By using power batteries with high output density as the batteries B of the battery strings St in the first power supply circuit 2 (batteries B of the battery strings St in the first, second, and third direct-current sweep units 10, 20, and 30), high output (power (W)) can be output from the first power supply circuit 2. Accordingly, nickel metal hydride secondary batteries are used as the batteries B of the battery strings St in the first power supply circuit 2 in the present embodiment.

According to the output request process of FIG. 9, the alternating-current power is output from the alternating-current sweep unit 3 when the requested power is equal to or less than a. In this case, since the energy density of the alternating-current sweep unit 3 (energy density of the batteries B of the battery strings St in the alternating-current sweep unit 3) is high and the capacity of the alternating-current sweep unit 3 is large, alternating-current power can be stably output for a long time. When the requested power is larger than a and large power is to be output from the power supply system 1, alternating-current power is output from the first power supply circuit 2 as well as from the alternating-current sweep unit 3. Alternating-current power satisfying the requested power can thus be output.

Balancing Request Process

Figure 10:
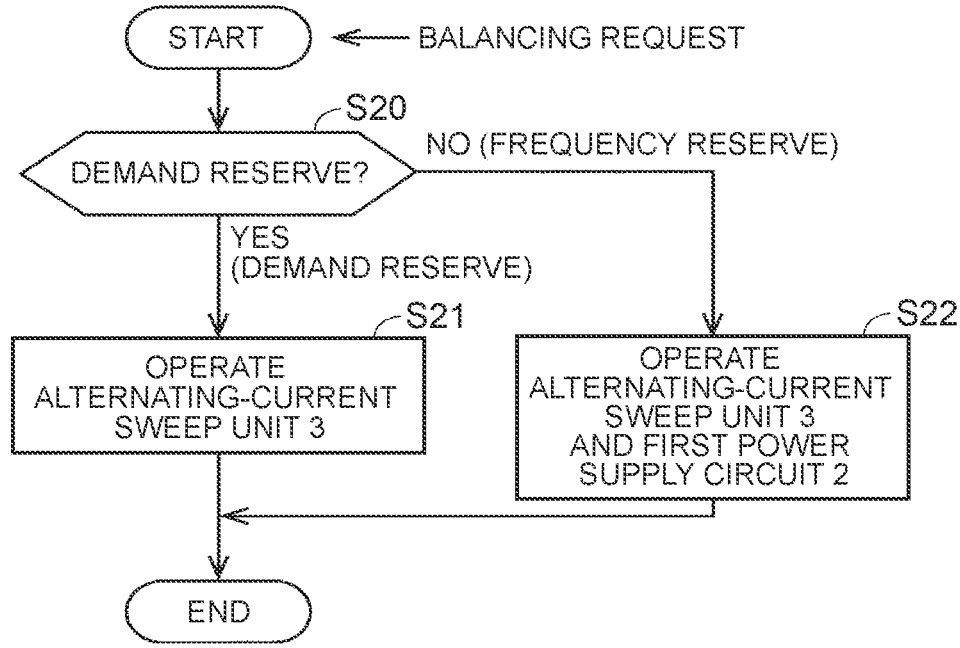
FIG. 10 is a flowchart showing an example of a balancing request process that is performed by the GCU 100 when power balancing is requested from the server 200.

FIG. 10 is a flowchart showing an example of a balancing request process that is performed by the GCU 100 when power balancing is requested from the server 200. The GCU 100 performs the balancing request process of this flowchart in response to a balancing request from the server 200. Reserve requested from the server 200 is an amount of output power such as generator output that can be adjusted to reduce frequency fluctuations and supply-demand imbalance, and is roughly divided into frequency reserve and balancing reserve. The frequency reserve is governor free control or load frequency control (LFC) in which output is controlled according to frequency fluctuations in seconds up to minutes, and the balancing reserve is economic load dispatching control (EDC) that eliminates the power supply and demand imbalance in long cycles of minutes or more. In the frequency reserve, the change in output to a command value (response time) is fast, and the output duration is relatively short. In the balancing reserve, the response time is slow, and the output duration is relatively long.

Referring to FIG. 10, the GCU 100 determines in S20 whether the balancing request is balancing reserve. When the balancing request is balancing reserve, namely when YES in S20, the process proceeds to S21. When balancing reserve is not requested, the balancing request is frequency reserve, namely NO in S20, and the process proceeds to S22.

In S21, the GCU 100 operates the alternating-current sweep unit 3. That is, the GCU 100 turns on the relay R2 to connect (in parallel) the alternating-current sweep unit 3 and the power grid PG. When the balancing request is downward demand response (DR), the SWs 11, 12 of the battery strings St4 to St9 are controlled by the SCUs A1 to A6 to output alternating-current power (three-phase alternating-current power) from the alternating-current sweep unit 3. A reverse power flow is performed, ie the alternating-current power is thus reversely supplied to the power grid PG. When the balancing request is upward DR, the GCU 100 controls the SWs 11, 12 of the battery strings St4 to St9 by the SCUs A1 to A6 so that the voltage of the battery strings St becomes slightly lower than the alternating-current voltage supplied from the power grid PG. The GCU 100 thus charges the batteries B of the battery strings St4 to St9 in the alternating-current sweep unit 3 as appropriate.

In S22, the GCU 100 operates the alternating-current sweep unit 3 and the first power supply circuit 2. That is, in addition to operating the alternating-current sweep unit 3 as described above, the GCU 100 turns on the relay R1 to connect (in parallel) the first power supply circuit 2 and the power grid PG. When the balancing request is downward DR, the GCU 100 controls the SWs 11, 12 of the battery strings St1 to St3 by the SCUs D1 to D3 to output direct-current power from the first, second, and third direct-current sweep units 10, 20, and 30. The GCU 100 converts this direct-current power to alternating-current power using the first to third inverters 50 to 70 and supplies the alternating-current power (three-phase alternating-current power) to the power grid PG. When the balancing request is upward DR, the GCU 100 converts the alternating-current power of the power grid PG to direct-current power using the first to third inverters 50 to 70. The GCU 100 controls the SWs 11, 12 of the battery strings St1 to St3 by the SCUs D1 to D3 to charge the batteries B included in the first, second, and third direct-current sweep units 10, 20, and 30 as appropriate.

The reserve that is handled in a balancing market is divided into primary control reserve, secondary control reserve (1), secondary control reserve (2), tertiary control reserve (1), and tertiary control reserve (2) in order of faster to slower change in output to a command value (response time) and shorter to longer output duration. In the governor free control corresponding to the primary reserve force, the output is increased or decreased according to a change in system frequency. In the LFC corresponding to the secondary control reserve (1), frequency fluctuations caused by load fluctuations are controlled. In the EDC corresponding to the secondary control reserve (2) and the tertiary control reserve (1), the output is distributed to generators in the most economical way. The tertiary control reserve (2) is regarded as low rate control reserve. Therefore, when the requested reserve is the primary control reserve or the secondary control reserve (1), the balancing request can be treated as frequency reserve. When the requested reserve is any of the control reserves other than the primary control reserve and the secondary control reserve (1), the balancing request can be treated as balancing reserve.

A power supply system with a relatively large capacity is required for the balancing reserve which has relatively long balancing time and long-cycle load fluctuations. A responsive power supply system is required for the frequency reserve with fast response time for which high responsiveness is required. According to the balancing request process of FIG. 10, the alternating-current sweep unit 3 with high energy density (energy density of the batteries B of the battery strings St in the alternating-current sweep unit 3) and large capacity is operated for the balancing reserve for which the balancing time is long and a large capacity is required, so as to stably respond to the balancing request. For the frequency reserve for short-cycle load fluctuations and fast response time for which high responsiveness is required, not only the alternating-current sweep unit 3 but also the first power supply circuit 2 including the batteries B with high output density (nickel metal hydride secondary batteries) are operated so as to respond to the balancing request.

The GCU 100 (control device) performs the output request process of FIG. 9 and the balancing request process of FIG. 10 when power balancing of the power grid PG (external power supply) is requested from the server 200. In the output request process, when the power requested by the power balancing is equal to or less than the predetermined value $\alpha$, alternating-current power is output from the alternating-current sweep unit 3. When the requested power is larger than the predetermined value $\alpha$, alternating-current power is output from the alternating-current sweep unit 3 and the first power supply circuit 2. In the balancing request process, power balancing is performed by the alternating-current sweep unit 3 when the power requested by the power balancing is balancing reserve. Power balancing is performed by the alternating-current sweep unit 3 and the first power supply circuit 2 when the requested power is frequency reserve.

In the case of the balancing reserve, the input and output power requested by the power supply system 1 fluctuates in long cycles, and the batteries B of the battery strings St are charged and discharged at low rate. In the case of the frequency reserve in which the requested input and output power fluctuates in short cycles and for which high responsiveness is required, the batteries B of the battery strings St are charged and discharged at high rate. In the present disclosure, the expression "power requested by the power balancing is within the predetermined range" includes the case where the input and output power requested by the power balancing fluctuates in long cycles, and the batteries B of the battery strings St are charged and discharged at low rate. In the present disclosure, the expression "power requested by the power balancing is larger than the predetermined range" includes the case where the input and output power requested by the power balancing fluctuates in short cycles, and the batteries B of the battery strings St are charged and discharged at high rate.

Level of Charge Control

FIG. 11 is a flowchart showing an example of a level of charge control process that is performed by the GCU 100. The GCU 100 performs the level of charge control process of this flowchart when charging of the batteries B of the battery strings St included in the alternating-current sweep unit 3 is started. For example, when the balancing request from the server 200 is upward DR, the GCU 100 controls the SWs 11, 12 of the battery strings St in the alternating-current sweep unit 3 by the SCUs A1 to A6 so that the voltage of the battery strings St becomes slightly lower than the alternating-current voltage supplied from the power grid PG. The GCU 100 thus starts charging the batteries B of the battery strings St in the alternating-current sweep unit 3, and performs S30 as well.

In S30, the GCU 100 calculates the level of charge (Wh) of each battery string St in the alternating-current sweep unit 3. For example, the GCU 100 calculates the level of charge of each battery string St (amount of power (Wh) stored in each battery string St) by obtaining input power (W) to each battery string St from the voltage of each battery string St detected by the voltage sensors Vu, Vv, and Vw and the input current to each battery string St detected by the current sensors Ia to If and integrating the input power over (charging) time.

In the subsequent step S31, the GCU 100 determines whether the difference among the levels of charge of the battery strings St calculated in S30 is equal to or larger than a predetermined value. For example, when the difference between the highest level of charge and the lowest level of charge is equal to or more than a predetermined value $\beta$, the GCU 100 determines that the difference among the levels of charge of the battery strings St is equal to or larger than the predetermined value. The predetermined value $\beta$ may be, for example, 500 Wh. When the difference among the levels of charge of the battery strings St is equal to or larger than the predetermined value, namely when YES in S31, the process proceeds to S32. When the difference between the highest level of charge and the lowest level of charge is less than the predetermined value $\beta$, namely when NO in S31, the routine proceeds to S33.

In S32, the GCU 100 controls the voltage of each battery string St so as to eliminate the difference among the levels of charge of the battery strings St. For example, the GCU 100 controls the voltage of each battery string St so as to reduce the input power to the battery string St with a relatively high level of charge and increase the input power to the battery string St with a relatively low level of charge. The process then proceeds to S33.

In S33, the GCU 100 determines whether charging is completed. For example, the GCU 100 may determine that charging is completed when the balancing time for the upward DR requested by the server 200 is over. When charging is not completed, namely when NO in S33, the process returns to S30, and the GCU 100 repeats S30 and the subsequent steps. When charging is completed, that is, when YES in S33, the current routine ends.

According to this level of charge control, when charging the batteries B included in the alternating-current sweep unit 3 with the power from the power grid PG (external power supply), control is performed so that the first U-phase battery string St4, the second U-phase battery string St5, the first V-phase battery string St6, the second V-phase battery string St7, the first W-phase battery string St8, and the second W-phase battery string St9 have the same level of charge. Therefore, the amount of power (Wh) stored in each battery string St becomes the same, and alternating-current power can be stably output from the alternating-current sweep unit 3.

In S31, the GCU 100 may determine whether the difference among the "total level of charge of the first and second U-phase battery strings St4, St5," the "total level of charge of the first and second V-phase battery strings St6, St7," and the "total level of charge of the first and second W-phase battery strings St8, St9" is equal to or larger than a predetermined value. In this case, in S32, the GCU 100 controls the voltage of each battery string St so as to eliminate the difference among the "total level of charge of the first and second U-phase battery strings St4, St5," the "total level of charge of the first and second V-phase battery strings St6, St7," and the "total level of charge of the first and second W-phase battery strings St8, St9." Even with such level of charge control, the "total level of charge of the first and second U-phase battery strings St4, St5," the "total level of charge of the first and second V-phase battery strings St6, St7," and the "total level of charge of the first and second W-phase battery strings St8, St9" become the same, and alternating-current power can be stably output from the alternating-current sweep unit 3.

Overcharge Reduction Control

FIG. 12 is a flowchart showing an example of an overcharge reduction control process that is performed by the GCU 100. The GCU 100 performs the overcharge reduction process of this flowchart when charging of the batteries B of the battery strings St included in the alternating-current sweep unit 3 is started. For example, as in the level of charge control, charging is started when the balancing request from the server 200 is upward DR. When charging is started, the GCU 100 acquires the SOC of each battery B in the alternating-current sweep unit 3 from the monitoring units BS of the battery circuit modules M of the battery strings St in the alternating-current sweep unit 3 in S40. The process then proceeds to S41.

In S41, the GCU 100 determines from the SOC of each battery B acquired in S40 whether there is any fully charged battery B. For example, the GCU 100 may determine that the battery B with an SOC of 90% or more is a fully charged battery. When there is fully charged battery B, that is, when YES in S41, the process proceeds to S42. When there is no fully charged battery B, that is, when NO in S41, the process proceeds to S43.

In S42, the GCU 100 switches the SW 11 of the battery circuit module M including the fully charged battery B to the ON state and the SW 12 of this battery circuit module M to the OFF state. The process then proceeds to S43. As a result, the battery circuit module M switches to the stopped state (see FIG. 6).

In S43, the GCU 100 determines whether charging is completed. The GCU 100 may determine that charging is completed when the balancing time for the upward DR requested by the server 200 is over. When charging is not completed, namely when NO in S43, the process returns to S40, and the GCU 100 repeats S40 and the subsequent steps. When charging is completed, that is, when YES in S43, the current routine ends.

According to this overcharge reduction control, during charging of the batteries B in the alternating-current sweep unit 3 with the power from the power grid PG (external power supply), when a battery B in the battery strings St is fully charged, the SW 11 of the battery circuit module M including the fully charged battery B is switched to the ON state and the SW 12 of this battery circuit module M is switched to the OFF state. Therefore, this battery B (battery circuit module M) is disconnected from the series connection. As a result, the fully charged battery B will not be charged, and the risk of overcharging can therefore be reduced.

Degradation Control

FIG. 13 is a flowchart showing an example of a degradation control process that is performed by the GCU 100. The GCU 100 performs the degradation control process of this flowchart at predetermined intervals while the alternating-current sweep unit 3 is in operation. The GCU 100 first acquires the SOH of each battery B in the alternating-current sweep unit 3 from the monitoring units BS of the battery circuit modules M of the battery strings St in the alternating-current sweep unit 3 in S50. The process then proceeds to S51.

In S51, the GCU 100 determines from the SOH of each battery B acquired in S50 whether there is any battery B with a level of degradation equal to or higher than a predetermined value. In the present embodiment, the monitoring unit BS estimates the capacity retention rate of the battery B as the SOH, and the GCU 100 determines the battery B with an SOH (capacity retention rate) equal to or lower than a predetermined value $\gamma$ to be a battery B with a level of degradation equal to or higher than the predetermined value. The predetermined value $\gamma$ may be, for example, 50%. When there is a battery B with a level of degradation equal to or higher than the predetermined value, namely when YES in S51, the process proceeds to S52. When there is no battery B with a level of degradation equal to or higher than the predetermined value, namely NO in S51, the current routine ends.

In S52, the GCU 100 switches the SW 11 of the battery circuit module M including the battery B with a level of degradation equal to or higher than the predetermined value to the ON state and the SW 12 of this battery circuit module M to the OFF state. The current routine then ends.

According to this degradation control, the levels of degradation of the batteries B of the battery strings St in the alternating-current sweep unit 3 are detected, and the SW 11 of the battery circuit module M including the battery B with a level of degradation equal to or higher than the predetermined value is switched to the ON state, and the SW 12 of this battery circuit module M is switched to the OFF state. Therefore, this battery B (battery circuit module M) is disconnected from the series connection. As a result, the alternating-current sweep unit 3 can be operated without using one or more batteries B with high level of degradation. Alternating-current power can therefore be stably output from the alternating-current sweep unit 3.

In the case where the monitoring unit BS estimates the rate of increase in internal resistance of the battery B as the SOH, the GCU 100 may determine the battery B with a rate of increase in internal resistance equal to or higher than a set value to be a battery B with a level of degradation equal to or higher than the predetermined value.

According to the present embodiment, nickel metal hydride secondary batteries with high output density are used as the batteries of the battery strings St in the first power supply circuit 2 that converts the output of the first to third direct-current sweep units 10 to 30 to alternating-current power using the first to third inverters 50 to 70 and outputs the alternating-current power. Moreover, lithium-ion secondary batteries with high energy density are used as the batteries B of the alternating-current sweep unit 3 that outputs alternating-current power from the first and second U-phase battery strings St4, St5, the first and second V-phase battery strings St6, St7, and the first and second W-phase battery strings St8, St9 that are Y-connected. Accordingly, by combining power batteries (nickel metal hydride secondary batteries) and energy batteries (lithium-ion secondary batteries), the power supply system 1 of the present embodiment can cause each kind of batteries to output power in the way they are good at (high output or long-term output). It is therefore possible to provide the high output, high capacity power supply system 1 at lower cost than power supply systems using energy batteries alone or power batteries alone.

In the present embodiment, the alternating-current sweep unit 3 outputs alternating-current power (three-phase alternating-current power) by Y-connecting the battery strings St. Since the alternating-current sweep unit 3 does not use any inverter, the cost can be reduced.

In the present embodiment, the first direct-current sweep unit 10, the second direct-current sweep unit 20, and the third direct-current sweep unit 30 are connected in parallel in the first power supply circuit 2. The first to third direct-current sweep units 10 to 30 correspond to the "direct-current sweep units" of the present disclosure, and the battery strings St1 to St3 correspond to the "first battery strings" of the present disclosure. In the present embodiment, three direct-current sweep units are connected in parallel. However, the number of direct-current sweep units may be one, or may be four or more.

In the present embodiment, the alternating-current sweep unit 3 uses the first and second U-phase battery strings St4, St5 as U-phase battery strings, uses the first and second V-phase battery strings St6, St7 as V-phase battery strings, and uses the first and second W-phase battery strings St8, St9 as W-phase battery strings. The numbers of U-phase battery strings, V-phase battery strings, and W-phase battery strings may be one, or may be three or more.

In the present embodiment, ternary (lithium nickel manganese cobalt oxide (NMC)) lithium-ion secondary batteries are used as the batteries B of the first U-phase battery string St4, the first V-phase battery string St6, and the first W-phase battery string St8, and lithium iron phosphate (LFP) lithium-ion secondary batteries are used as the batteries B of the second U-phase battery string St5, the second V-phase battery string St7, and the second W-phase battery string St9. However, the batteries B of each battery string St may be any kinds of lithium-ion secondary batteries, and different kinds of lithium-ion secondary batteries may be mixed in each battery string St.

The embodiment disclosed herein should be considered to be illustrative and not restrictive in all respects. The scope of the present disclosure is shown by the scope of claims rather than by the above description of the embodiment, and is intended to include all modifications within the meaning and scope equivalent to the scope of claims.

What is claimed is:

1. A power supply system comprising:
    an alternating-current sweep unit that outputs alternating-current power from a U-phase battery string, a V-phase battery string, and a W-phase battery string that are Y-connected;
    a first power supply circuit that converts output of a direct-current sweep unit to alternating-current power using an inverter and outputs the alternating-current power, the direct-current sweep unit including a first battery string; and
    a control device that controls the alternating-current sweep unit and the first power supply circuit, wherein:
    the U-phase battery string, the V-phase battery string, the W-phase battery string, and the first battery string each include multiple battery circuit modules connected in series;
    each of the battery circuit modules includes
        a battery,
        an output terminal that outputs a voltage of the battery,
        a first switch connected to the output terminal and connected in parallel with the battery, and
        a second switch connected in series with the battery;
    each of the battery circuit modules is configured in such a manner that the voltage of the battery is applied to the output terminal when the first switch is in an OFF state and the second switch is in an ON state;
    the first power supply circuit and the alternating-current sweep unit are configured to be able to be electrically connected to an external power supply; and
    an energy density of each of the batteries included in the U-phase battery string, the V-phase battery string, and the W-phase battery string is higher than an energy density of each of the batteries included in the first battery string.

2. The power supply system according to claim 1, wherein an output density of each of the batteries included in the first battery string is higher than an output density of each of the batteries included in the U-phase battery string, the V-phase battery string, and the W-phase battery string.

3. The power supply system according to claim 1, wherein:
    each of the batteries included in the first battery string is a nickel metal hydride battery; and
    each of the batteries included in the U-phase battery string, the V-phase battery string, and the W-phase battery string is a lithium-ion battery.

4. The power supply system according to claim 1, wherein the control device is configured to:
    control the alternating-current sweep unit and the first power supply circuit so as to perform power balancing of the external power supply by input and output power of the alternating-current sweep unit and the first power supply circuit;
    when power requested by the power balancing is within a predetermined range, connect the alternating-current sweep unit to the external power supply and perform the power balancing of the external power supply by the alternating-current sweep unit; and
    when the power requested by the power balancing is larger than the predetermined range, connect the first power supply circuit in addition to the alternating-current sweep unit to the external power supply and perform the power balancing of the external power supply by the alternating-current sweep unit and the first power supply circuit.

5. The power supply system according to claim 1, wherein:
    the batteries included in the U-phase battery string, the V-phase battery string, and the W-phase battery string are charged with power from the external power supply; and
    the control device is configured to control the alternating-current sweep unit in such a manner that the U-phase battery string, the V-phase battery string, and the W-phase battery string have a same level of charge.

6. The power supply system according to claim 1, wherein:
    the batteries included in the U-phase battery string, the V-phase battery string, and the W-phase battery string are charged with power from the external power supply; and
    the control device is configured to control the alternating-current sweep unit in such a manner that when a battery included in the U-phase battery string, the V-phase battery string, and the W-phase battery string is a fully charged battery and the multiple battery circuit modules includes a battery circuit module including the fully charged battery, the first switch of the battery circuit module including the fully charged battery is switched to the ON state and the second switch of the battery circuit module including the fully charged battery is switched to the OFF state to disconnect the battery circuit module including the fully charged battery from a series connection.

7. The power supply system according to claim 1, wherein the control device is configured to:
    detect levels of degradation of the batteries included in the U-phase battery string, the V-phase battery string, and the W-phase battery string; and
    control the alternating-current sweep unit in such a manner that the first switch of a battery circuit module including a battery with a level of degradation higher than a predetermined value is switched to the ON state and the second switch of the battery circuit module including the battery with the level of degradation higher than the predetermined value is switched to the OFF state to disconnect the battery circuit module including the battery with the level of degradation higher than the predetermined value from a series connection, the multiple battery circuit modules including the battery circuit module including the battery with the level of degradation higher than the predetermined value.

* * * * *